Nov. 12, 1935.  C. A. SAWTELLE  2,020,578
BRAKE
Filed Dec. 19, 1931  2 Sheets-Sheet 1
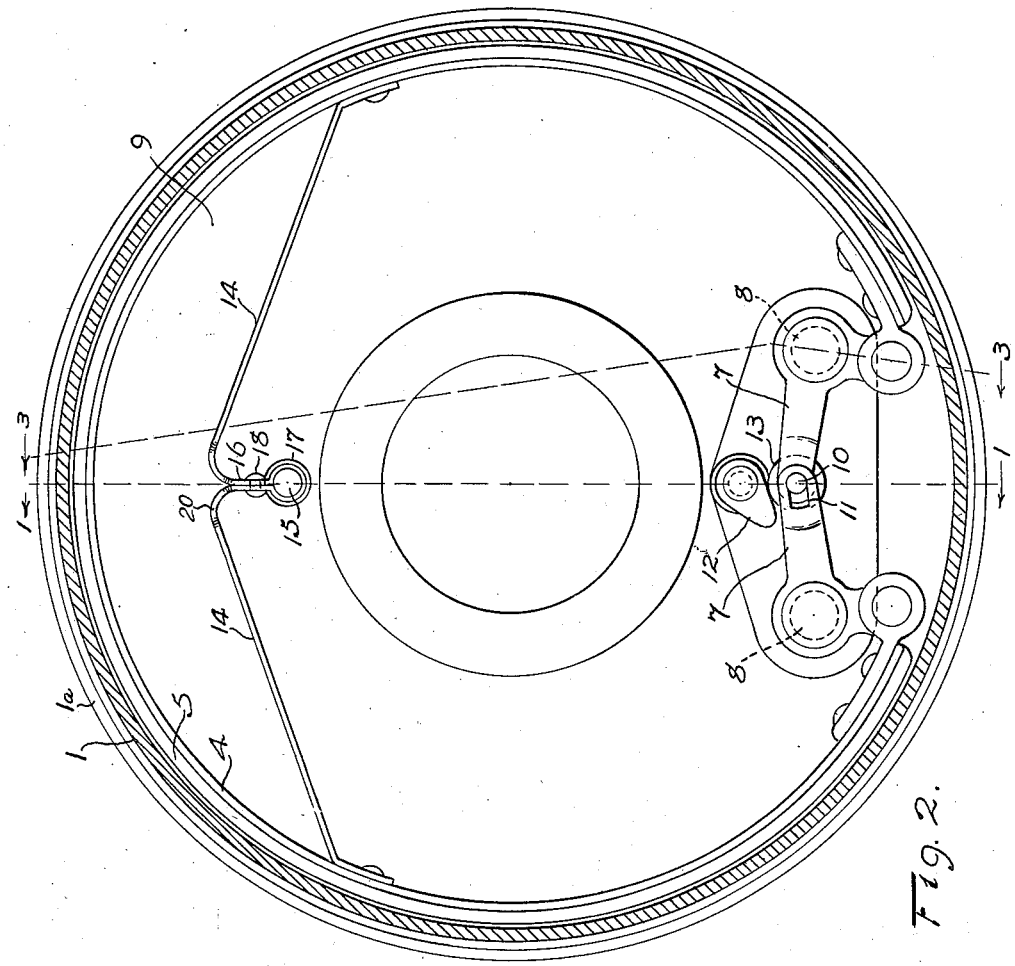
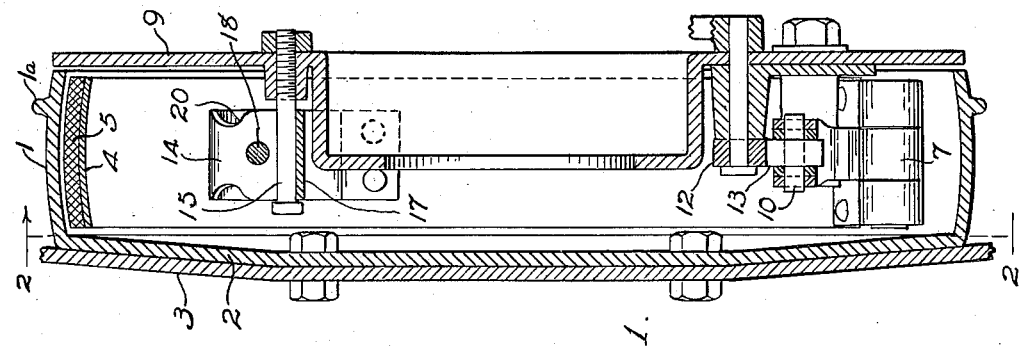
INVENTOR
Charles A. Sawtelle
BY
ATTORNEY Nov. 12, 1935.                C. A. SAWTELLE                  2,020,578
                                    BRAKE
                              Filed Dec. 19, 1931              2 Sheets-Sheet 2

INVENTOR
Charles A. Sawtelle
BY
J. S. Murray
ATTORNEY

Patented Nov. 12, 1935

2,020,578

UNITED STATES PATENT OFFICE 2,020,578

BRAKE

Charles A. Sawtelle, Detroit, Mich., assignor, by direct and mesne assignments, to S. and D. Engineering Company, Detroit, Mich., a corporation of Michigan Application December 19, 1931, Serial No. 582,101

13 Claims. (Cl. 188—78)

This invention relates to brakes and particularly to vehicle brakes.

Vehicle brake drums as now almost universally constructed, comprise a cylindrical annulus carried by a wheel and engageable under regulable pressure by a relatively fixed friction member, such as a band or shoe. Such annulus is ordinarily free at one side and at its other is rigidly connected to the wheel, as by a plate formed integrally with said annulus.

Under frictional heat the expansion of said annulus at its free side exceeds that at its fixed side, whereby the annulus acquires a slight flare, known to automotive engineers as "bell-mouthing". Since the ordinary brake band or shoe is designed to engage a cylindrical annulus, it follows that bell mouthing to some extent destroys conformity between the friction-receiving and friction-applying elements, thus reducing the effective friction area and detracting from braking efficiency. This loss of efficiency is particularly noticeable, since it arises generally upon a prolonged or powerful application of the brakes, and consequently at a time when fully effective braking is most imperative.

Bell mouthing, moreover, causes uneven wear of the brake linings and often occasions a squealing or chatter of the brakes that is highly objectionable.

It is the object of the present invention to eliminate the described objectionable results of bell mouthing by so conformingly shaping the friction-applying and friction-receiving elements of a radially acting brake as to permit maintenance of their conformity under bell-mouthing conditions.

It is also an object of the invention to correspondingly transversely curve the engaging faces of the friction-applying and friction-receiving elements of a brake, and preferably to give said faces a spherical form, while adapting the friction-applying member to freely undergo a slight travel axially of the brake to maintain full and effective conformity of said faces, despite bell-mouthing of the friction-receiving member.

Another object is to so conformingly curve the engaging faces of the friction-applying and friction-receiving members of a brake as to assure full and accurate engagement of said members, even if the friction applying member be mounted at a slight divergence to the plane of rotation of the drum.

These and various other objects the invention attains by the construction hereinafter described, and illustrated in the accompanying drawings, wherein:

Fig. 1 is a view in diametrical, sectional elevation of a brake embodying the invention, taken upon the line 1—1 of Fig. 2.

Fig. 2 is a cross sectional view of said brake, taken upon the line 2—2 of Fig. 1.

Figure 4:
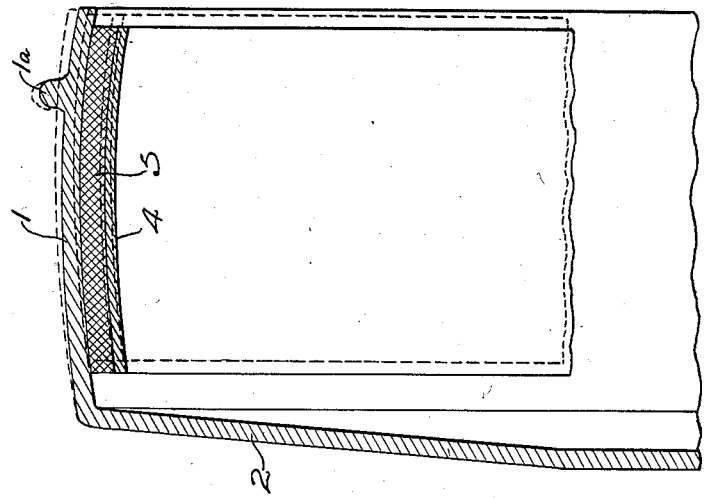
Fig. 4 is an enlarged cross sectional view of the drum rim (or annulus) showing a brake band applied thereto and showing in dash lines the manner in which the band still conforms to the drum, when the latter has bell-mouthed.

In these views, the reference character 1 designates the friction-receiving annulus of a brake drum, and 2 a plate connected rigidly and preferably integrally to one side of said annulus for securing the drum to a wheel 3. Preferably, said annulus is reinforced upon its exterior face, as by an annular rib 1a.

The annulus 1 is interiorly engageable by a friction-applying member consisting, as illustrated, of a circular band 4 having the usual spaced ends, and carrying, as is customary, a woven or other drum-engaging lining 5 upon its outer face.

Departing sharply from prior parctice, the annulus 1 is spherically curved (or has its interior face so curved) about a point located preferably in the drum axis and at the drum center. The band 4 and its lining 5 are similarly curved, whereby said lining fully conforms to the drum, when the brake is applied.

Figure 3:
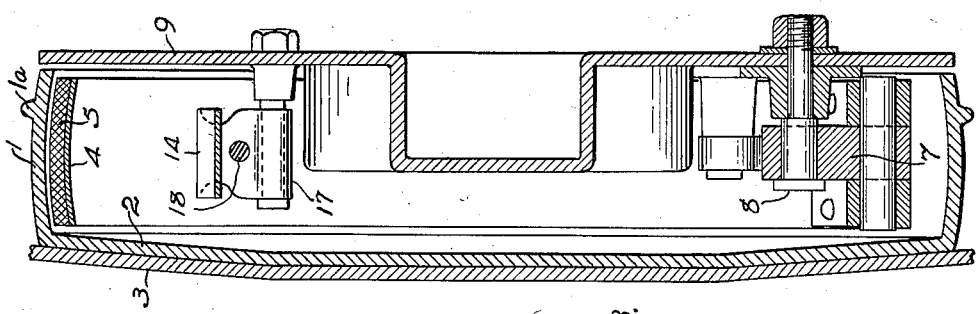
Fig. 3 is a sectional elevation of the brake taken on the line 3—3 of Fig. 2.

In Fig. 3 there is illustrated in full lines the position of engagement of the member 4, 5 with the drum when the latter is of normal form, and in dash lines is shown, with considerable exaggeration, a bell-mouthed condition of the drum and the corresponding braking position of the member 4, 5. It will be noted that in conforming to the bell-mouthed drum, the friction-applying element 4, 5 is required to undergo a slight travel axially of the drum in addition to its applied expansion. Various provisions for such axial travel may be made, according to the particular mounting of the friction-applying element and its actuating means.

The illustrated actuating means serves also as an anchorage for the member 4, 5 and comprises a pair of bell cranks 7, each pivoted at the juncture of its divergent arms upon a pin 8 rigidly projecting from the usual circular carrier plate 9 forming a closure for the open side of the drum. Said plate is held stationary (with respect to rotation of the wheel) in any well-known manner. Corresponding arms of the bell cranks 7 project outwardly from the pins 8 and are pivoted respectively to the brake band extremities. The other arms of said bell cranks project toward each other and may be interconnected by a pin 10 engaging slots 11 in the arm extremities. The bell cranks may be actuated in unison in any suitable manner, as for example by a cam 12 engageable with the roller 13 journaled on the pin 10. The bell cranks are free to undergo a limited sliding travel on their pins 8, parallel to the drum axis.

The end portions of the brake band are guided as well as actuated by the two bell cranks, in the expansion and contraction of said band, and it is desirable to provide means for guiding the mid portion of the band and maintaining the proper circular form of said portion, in use of the band. For this purpose, a pair of resilient arms 14 are secured to the band 4, at points well removed from their extremities and are extended toward each other so as to engage a common mounting pin 15 projecting from the carrier plate in the diametrical plane of the band which lies midway between their spaced ends. The pin 15 is further positioned preferably approximately midway between the drum center and midpoint of the band. The arms 14 converge at an angle such as to bring said arms into proximity, outwardly of the pin 15, said arms being bent to extend contiguously and radially toward the pin, as indicated at 16, and being connected by a loop 17, which pivots both arms upon said pin, also affording them a limited sliding travel thereon. The radial (or normally radial) portions of said arms are rigidly held in mutual contact by a rivet 18 or the like. The described construction is conveniently achieved by forming the arms 14 as leaf springs and connecting said arms integrally by said parts 16 and 17.

Preferably the edges of said arms are notched, as indicated at 20 at their adjacent bends, thus somewhat weakening the arms at these points so that they may fulcrum freely to undergo such relative swinging as is incidental to expansion and contraction of the band.

In use, the described brake is applied by rocking the cam 12 against the roller 13, thereby spreading the band-engaging bell-crank arms and expanding the band. Since the lining 5 and annulus I are of conforming spherical shape, it is readily apparent that said lining and band will fully engage when the drum is of normal shape.

When frictional heat distorts the drum, the annulus I, as aforestated, undergoes a major expansion at its free edge and a minor expansion at its juncture with the plate 2, thus assuming a flared or bell mouthed shape. While the magnitude of this distortion is small and it has been necessary to resort to considerable exaggeration to illustrate this effect, it is important to note that the resulting loss of efficiency is frequently of serious magnitude. Under bell mouthing conditions, the friction member 4, 5 on its initial application to the drum, lacks full conformity to the latter, but such conformity is immediately established through the slight axial deflection of said friction member resulting from engagement of the spherical face of its lining 5 with that of the annulus I. The provision for a limited sliding of bell cranks 7 on the pins 8 permits the described axial deflection of the member 4, 5 by permitting said bell cranks to participate in such deflection. It is here to be noted that bell-mouthing of the spherical annulus I, because of the slight movement involved, has the approximate effect of shifting the center of curvature of the member I slightly away from the plate 2. Consequently, by providing for a corresponding shifting of the member 4, 5 under bell-mouthing conditions, there is secured an approximation of concentricity between the friction-applying and friction-receiving members, adequately close to entirely eliminate the efficiency loss so objectionable in present construction.

While it is apparent that the illustrated embodiment of my invention is well calculated to adequately fulfill the objects and advantages primarily stated, it is to be understood that the invention is susceptible to variation, modification and change within the spirit and scope of the subjoined claims.

What I claim is:

1. A brake drum comprising an annulus having a spherical friction-receiving face.

2. A brake drum comprising an annulus having a spherical internal friction-receiving face.

3. In a brake, a friction-applying member and an annular friction-receiving member, said members having spherically engageable faces.

4. A brake comprising an annular friction-receiving member having an interior spherical face, and a friction-applying member within said drum, having a drum-engaging face spherically curved conformingly to said annulus.

5. A brake comprising an annular friction-receiving member free at one side and rigidly mounted at its other side, and consequently subject to a flaring expansion under friction heat, and a friction-applying member within said drum having a drum-engaging face conforming to said annulus, said friction-applying member being freely axiably slidable parallel to the drum axis to compensate for flaring of said annulus under heat conditions.

6. A brake comprising an annular friction-receiving member having an interior substantially spherical face, and a friction-applying member within said drum, having a drum-engaging face spherically curved conformingly to the friction-receiving member, said friction-applying member having a free limited movement bodily along the drum axis.

7. In a brake, a rotatable drum, a friction-applying member actuable substantially radially of said drum to engage the drum, and bodily slidable substantially transversely to the plane of rotation of the drum to compensate for a distortion due to heat of friction.

8. A brake comprising a rotative drum open at one side thereof, a carrier plate closing said open side and fixed as regards drum rotation, a plurality of pins projecting from said carrier plate transversely to the plane of rotation of the drum, a friction-applying member slidable on said pins to compensate for heat distortion of the drum, and actuating means for said friction-applying member.

9. A brake comprising a drum, a friction-applying member interiorly engageable with said drum, a pivotal actuating element for said friction-applying member, and a pivotal support for said actuating element, affording said element a limited free sliding travel parallel to the drum axis.

10. A brake drum having a rim providing a friction face, said face having a spherical curvature and extending substantially the full width of said rim.

11. A brake comprising an annular friction-receiving member and a coacting friction-applying member, forming a split annulus having spaced ends, and operating means for the friction-applying member effective to spread said ends, the friction-applying member being slidable in the direction of the axis of said member.

12. A brake comprising a friction-receiving annulus and a coacting friction-applying member, substantially annular and having spaced ends, means for spreading said ends to engage the friction-applying member operatively with the friction-receiving member, means engaging the friction-applying member remotely from its spaced ends for guiding and properly positioning said member, the friction-applying member being bodily slidable in the direction of its axis relative to said spreading means and relative to said guiding and positioning means.

13. A brake comprising a rotative drum, a plurality of pins fixed as regards drum rotation and transverse to the plane of such rotation, a friction-applying member slidable on said pins to compensate for heat distortion of the drum, and means for engaging the friction-applying member with the drum.

CHARLES A. SAWTELLE.